(No Model.)

C. C. PETERS.
APPARATUS FOR RECUTTING FILES.

No. 434,884.　　　　　　　　　　Patented Aug. 19, 1890.

Witnesses:
H. N. Plaisted.
R. M. Elliott.

Inventor:
Chas. C. Peters,
by H. A. Toulmin.
his Attorney

UNITED STATES PATENT OFFICE.

CHARLES C. PETERS, OF SPRINGFIELD, OHIO, ASSIGNOR OF TWO-THIRDS TO JOHN V. B. HOYLE AND CHARLES W. WADSWORTH, BOTH OF SAME PLACE.

APPARATUS FOR RECUTTING FILES.

SPECIFICATION forming part of Letters Patent No. 434,884, dated August 19, 1890.

Application filed June 6, 1889. Serial No. 313,345. (No model.)

*To all whom it may concern:*

Be it known that I, CHARLES C. PETERS, a citizen of the United States, residing at Springfield, in the county of Clark and State of Ohio, have invented certain new and useful Improvements in Apparatus for Recutting Files, of which the following is a specification, reference being had therein to the accompanying drawings.

This invention relates to an improvement in apparatus for recutting files by the chemical action of certain electrolytes under the influence of an electric current.

Heretofore many attempts have been made to recut worn files by submerging the same in an acid solution or electrolyte rendered caustic by the influence of an electric current. These attempts have been only partially successful, for as the files were arranged in series with and between cathodes—such as carbon plates—the resistance would be much greater at one end of the series than at the other end, and where a chemical action was set up sufficiently strong to affect those files farthest removed from the point at which the current entered, those at the point of entrance would be destroyed by the too violent action of the electrolyte. Thus a chemical action that is sufficiently strong to affect properly a series of files at one end will destroy those at the opposite end—or, in other words, where the files are arranged between the cathodes and in series it is impossible for the resistance to be the same throughout the series. Hence a uniform chemical action cannot be obtained.

It is the object of the present invention to overcome these obstacles in a simple and effective manner, and to this end my invention consists in making the files to be cut form the anodes by connecting all directly with the positive pole of a battery or other source of electricity, and the carbon or other plates the cathodes by connecting all with the negative pole of a battery, whereby the resistance and consequently the chemical action will be the same in any given number of files.

The invention consists, furthermore, in the novel arrangement and combination of parts of such an apparatus, as will be hereinafter fully described and claimed.

Figure 1:
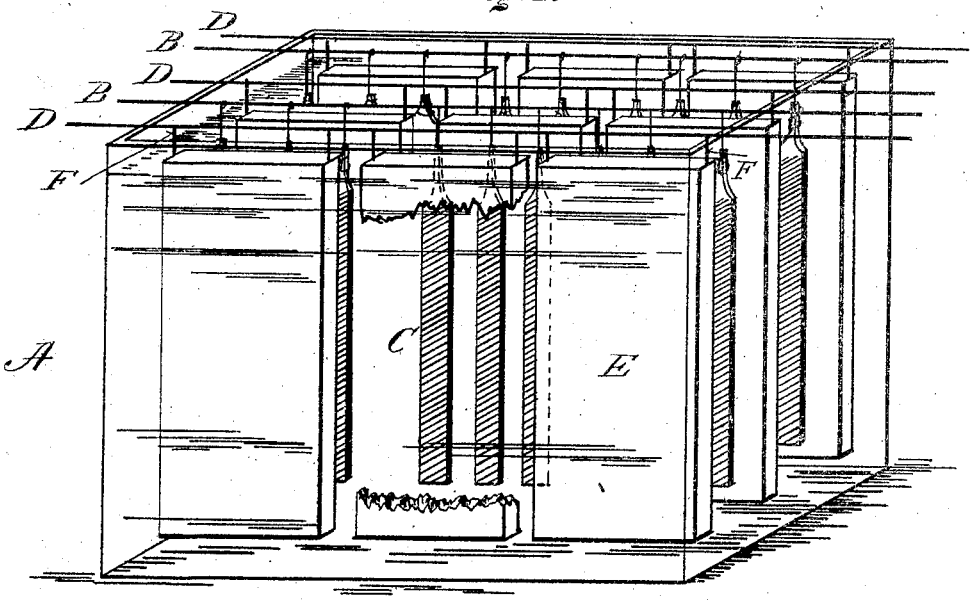
Figure 2:
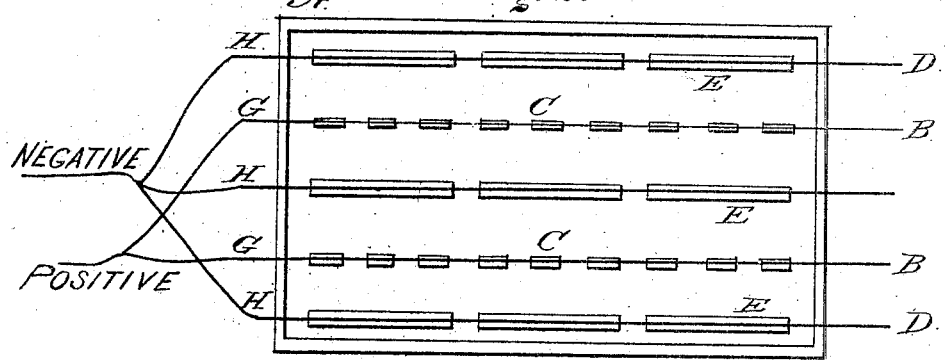

In the accompanying drawings, forming part of this specification, and in which like letters of reference indicate corresponding parts, Figure 1 is a perspective view of my improved apparatus, showing one way of supporting the files and carbon plates in the electrolyte and their respective positions, and Fig. 2 is a top plan view of the same showing more particularly the peculiar manner of arranging the files and carbon plates.

Referring to the drawings, A designates a rectangular tank for holding the electrolyte used in recutting the files, the said tank being constructed of a suitable dielectric material—such as glass, porcelain, or wood.

B designates metallic rods, suitably supported at the top of the tank or vessel and supporting the files C forming the anodes, of which there may be any desired number.

D designates similar rods, and E the cathodes supported thereby. The negative electrodes may be of any desired or proper material; but for obvious reasons carbon plates are preferred, as shown.

In carrying the invention into practice, the tank is first filled with an electrolyte having normally a feeble and slow action upon iron or steel, but which will become rapid and caustic under the influence of an electric current. The particular elements of this electrolyte may vary according to the necessities of the case, and they may be composed of either acids or alkalies. Therefore I do not deem it necessary to state the component parts of the same, but simply to mention the general characteristics and properties it possesses. The carbon plates forming the cathodes are suspended in the electrolyte, preferably in the manner shown—that is, in rows extending parallel to the side of the tank—and are connected with the metallic supporting-rods by means of wires F, or in any other desired manner. The files forming the anodes are suspended in a similar manner. The anodes and cathodes are connected with a suitable electrical source by means of wires, those designated by G leading from the files and connecting with the positive pole of the battery, and those designated by H leading from the the carbon plates and connecting with the negative pole of the battery. When an electric current passes through the files and from the files through the electrolyte to the carbon plates, a chemical action is set up, which renders the electrolyte caustic, and as the carbon plates are arranged at each side of each of the files it will necessarily follow that both sides of each of the files will be similarly affected. Moreover, by the peculiar arrangement described the resistance will be uniform throughout the entire number of files, thereby preventing the destruction of those nearest to the point of entrance. Moreover by the arrangement of the files and electrodes herein described I secure such an action as to affect the files at the base and throughout the length of their teeth equally, as distinguished from acting merely upon the teeth immediately adjacent to their cutting-edge, which would have the effect ultimately of shortening the teeth and blunting them by making the longer of their sides too greatly obtuse.

Having thus fully described my invention, what I claim as new, and desire to secure by Letters Patent, is—

In an apparatus for recutting files by electro-chemical action, the combination, with a vessel and an electrolyte therein and metallic bars extending over the said vessel and forming an electrical conductor, of cathodes composed of carbon plates arranged in said vessel in series and immersed in the electrolyte and electrically connected to said rods, a wire connecting said rods with the negative pole of a source of electricity, and another rod extending over said vessel and between the other rods, and a series of files forming anodes connected to said rod and immersed in the electrolyte between the two series of cathodes, wires connecting said rod with the positive pole of a source of electricity, the sole electrical connection between the cathodes and files or anodes being through said rods, their electrical connections, and the electrolyte, whereby the results herein set forth are obtained.

In testimony whereof I affix my signature in presence of two witnesses.

CHARLES C. PETERS.

Witnesses:
RANDOLPH COLEMAN,
JOHN C. BASSETT, Jr.